United States Patent [19]

Nakatsuka et al.

[11] Patent Number: 4,759,612

[45] Date of Patent: Jul. 26, 1988

[54] TWISTED NEMATIC TYPE LIQUID CRYSTAL DISPLAY DEVICE HAVING A COLOR POLARIZER TO PROVIDE AN ACHROMATIC OR COLORLESS BACKGROUND

[75] Inventors: Hideaki Nakatsuka; Mikio Kanazaki; Yasuhiko Kando; Toshihiko Tojo; Shinji Hasegawa, all of Mobara, Japan

[73] Assignee: Hitachi, Ltd., Tokyo, Japan

[21] Appl. No.: 888,429

[22] Filed: Jul. 23, 1986

[30] Foreign Application Priority Data

Aug. 2, 1985 [JP] Japan .................. 60-169806

[51] Int. Cl.[4] .............................................. G02F 1/13
[52] U.S. Cl. .................................... 350/337; 350/338
[58] Field of Search ............................ 350/337, 350 F

[56] References Cited

U.S. PATENT DOCUMENTS

| | | | |
|---|---|---|---|
| 4,497,543 | 2/1985 | Aoki et al. | 350/337 |
| 4,541,693 | 9/1985 | Knoll et al. | 350/339 F |
| 4,610,509 | 9/1986 | Sorimachi et al. | 350/350 F |
| 4,653,861 | 3/1987 | Kando et al. | 350/337 |

FOREIGN PATENT DOCUMENTS

| | | | |
|---|---|---|---|
| 107020 | 6/1985 | Japan | 350/337 |
| 0045229 | 3/1986 | Japan | 350/337 |

OTHER PUBLICATIONS

T. J. Scheffer and J. Nehring, "Optimum Polarizer Combinations for Twisted Nematic Display", Oct. 1976 Conference, Switzerland.

A. R. Kmetz, "A Single-Polarizer Twisted Nematic Display" proceeding of the SID, vol. 21/2, 1980.

Primary Examiner—Stanley D. Miller
Assistant Examiner—Huy V. Mai
Attorney, Agent, or Firm—Antonelli, Terry & Wands

[57] ABSTRACT

A liquid crystal display device comprises a liquid crystal layer sandwiched between upper and lower electrode substrates subjected to aligning treatment. The liquid crystal layer includes a nematic liquid crystal added with a chiral material and has a 160°–360° twisted helical structure. A pair of polarizers are disposed adjacent to the electrode substrates with their polarization or absorption axes inclined by respective predetermined angles with respect to the aligning directions of the electrode substrates. At least one of the polarizers is formed by a color polarizer for compensating a wavelength dependence of transmittance (or the coloring due to birefringence) resulting from the anti-coincidence between the polarization or absorption axis of the polarizer and the aligning direction of the electrode substrate, i.e. an optical axis of liquid crystal molecules adjacent to the substrate, so that light emerging from the device becomes approximately achromatic or colorless.

6 Claims, 6 Drawing Sheets

TWISTED NEMATIC TYPE LIQUID CRYSTAL DISPLAY DEVICE HAVING A COLOR POLARIZER TO PROVIDE AN ACHROMATIC OR COLORLESS BACKGROUND

BACKGROUND OF THE INVENTION

The present invention relates to a twisted nematic (TN) type liquid crystal display device, and more particularly to such a device having a larger twist angle.

A well-known twisted nematic type liquid crystal display device has a 90° twisted helical structure of a nematic liquid crystal which has a positive dielectric anisotropy and is sealed between two substrates having transparent electrodes arranged thereon in desired display patterns. Polarizing plates (polarizers) are arranged on outer surfaces of the electrode substrates with polarization axes (or absorption axes) thereof perpendicular or parallel to the major axes of the liquid crystal molecules adjacent to the substrates. As well known, however, the time-multiplexed drive characteristics of the liquid crystal display device of this type including a luminance-voltage characteristic, a viewing-angle dependence and a time-multiplexability are not satisfactory. Therefore, the practically tolerable maximum of the number of time-multiplexing which corresponds to the number of scanning electrodes is 32 or 64. This limitation cannot satisfy demands to improve the image quality of the liquid crystal display device and to increase the number of data to be displayed which corresponds to the number of scanning electrodes.

U.S. Pat. No. 4,653,841 to Kando, et al has proposed a liquid crystal display device which has a 160°–200° twisted helical structure of a nematic liquid crystal added with a chiral (or optical active) material, thereby providing excellent time-multiplexed drive characteristics and hence excellent image quality even if the number of time-multiplexing is more than 32. Further, JP-A No. 60-107020 has proposed a liquid crystal display device having a 180°–360° twisted helical structure. In these devices, a pair of polarizers having the liquid crystal layer sandwiched therebetween are disposed with the polarization or absorption axes thereof which are inclined by predetermined angles with respect to the major axes or optical axis of liquid crystal molecules adjacent to electrode substrates, respectively. Display is based on the effect of birefringence of light due to the anti-coincidence between the axis of the polarizer and the optical axis of liquid crystal molecules. Therefore, there is a problem in display appearance that light emerging from the device is colored. Typically, the background is yellowish green and the selected or excited point is dark blue.

SUMMARY OF THE INVENTION

An object of the present invention is to provide a twisted nematic type liquid crystal display device with a larger twist angle in which the display appearance is improved so that the a substantially or approximately achromatic or colorless background is provided.

To that end, there is provided a liquid crystal display device, wherein the twist angle of a helical structure of liquid crystal molecules falls within a range between 160° and 360°, a pair of polarizers at least one of which is a color polarizer are arranged before and after the helical structure of the liquid crystal moledules in such a manner that the polarization axes of the polarizers are inclined by predetermined angles with respect to the major axes of liquid crystal molecules adjacent to electrode substrates (i.e. the respective liquid crystal molecule aligning directions of the electrode substrates).

The color polarizer has a spectral characteristic which compensates a wavelength dependence of transmittance (or the coloring due to birefringence) resulting from the anti-coincidence between the liquid crystal molecule aligning direction of the electrode substrate and the polarization axis of the polarizer. As a result, light emerging from the device, which is otherwise colored, can be made approximately colorless or achromatic.

It is preferable that the inclination angle of the polarization direction of the polarizer with respect to the liquid crystal molecule aligning direction of the electrode substrate is within a range from 20° to 70°. It is preferable that a product $\Delta n \cdot d$ of the thickness d ($\mu$m) of the liquid crystal layer and the optical or refractive-index anisotropy $\Delta n$ of the liquid crystal falls within a range from 0.7 $\mu$m to 1.2 $\mu$m.

DESCRIPTION OF THE PREFERRED EMBODIMENTS

Embodiments of the present invention will be described referring to the accompanying drawings.

Figure 1:
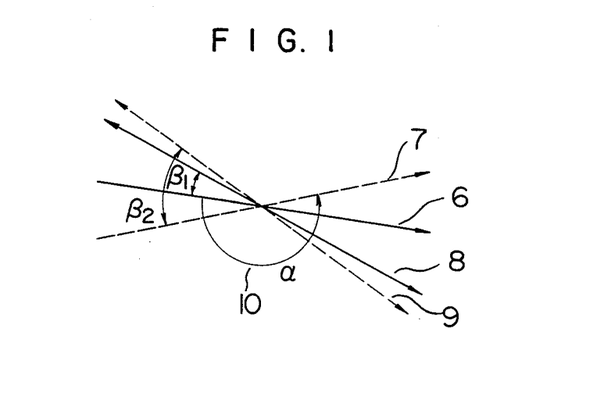
FIG. 1 is a representation for explaining the general relationship between the liquid crystal molecule aligning directions of electrode substrates, the twist direction of liquid crystal molecules, and the axes of polarizers of a liquid crystal display device according to the present invention.
Figure 2:
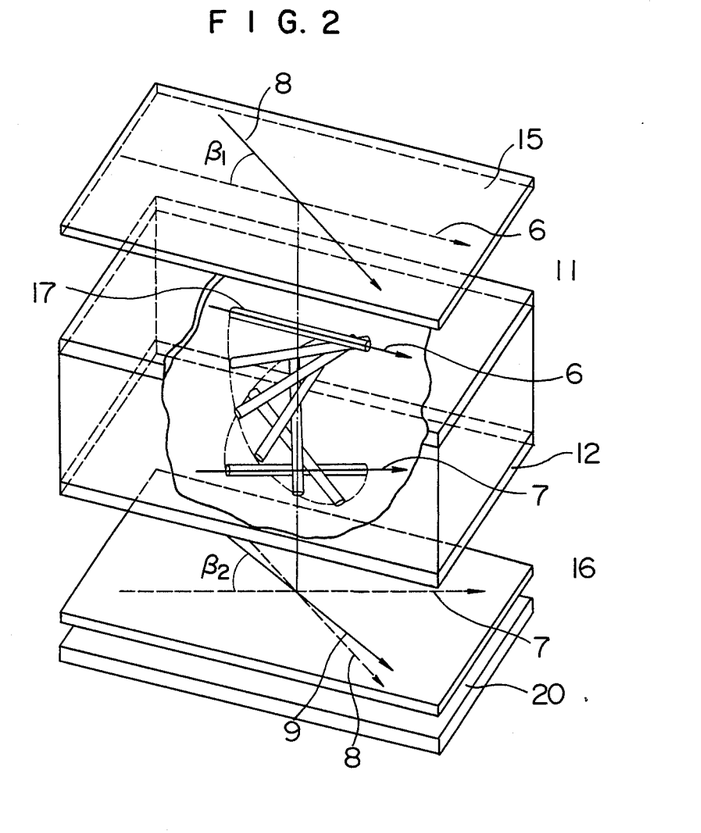
FIG. 2 is a perspective view of the liquid crystal display device according to the invention.

FIG. 1 shows the relationship between the liquid crystal molecule aligning directions (e.g., rubbing directions) of electrode substrates, the twist direction of liquid crystal molecules, and the polarization axes (or absorption axes) of polarizers of a liquid crystal display device according to the present invention when the liquid crystal display device is viewed from the upper direction. FIG. 2 is a perspective view showing this relationship. In actual, members shown in FIG. 2 are unitarily assembled. Upper and lower electrode substrates 11 and 12 each having a surface structure subjected to aligning treatment by which the major axes of liquid crystal molecules adjacent to the substrate are aligned or oriented in a predetermined direction, are sealed with a sealing agent, and a nematic liquid crystal added with a chiral (or optical active) material is filled in a space defined between the substrates. In accordance with a teaching of the present invention, a color polarizer is used for at least one of upper and lower polarizers 15 and 16, as will be described in later. Reference numeral 20 represents a reflector plate to be disposed below the lower polarizer 16 when the liquid crystal display device is of a reflection type.

A twist direction 10 (indicated by a curved arrow) and a twist angle $\alpha$ of liquid crystal molecules 17 are defined by the aligning or rubbing direction 6 of the upper substrate 11, the aligning or rubbing direction 7 of the lower substrate 12, and the kind and amount of the chiral material added to the nematic liquid crystal. In particular, the twist direction is determined by the kind of chiral material. The twist angle is determined by the rubbing directions 6 and 7 of the upper and lower electrodes 11 and 12. The stability of orientation of the liquid crystal molecules is determined by a specific pitch of the chiral material, the amount thereof, and the thickness of a liquid crystal layer. When the twist angle $\alpha$ is large (for example, in the vicinity of 270°), it is preferable to use a known oblique evaporation method for the aligning treatment instead of the rubbing method. For example, silicon oxide (SiO) is evaporated from a direction having the inclination of 3°–10° with respect to the electrode substrate surface to form a liquid crystal molecule aligning film. Namely, it is preferable that the inclination angle of the liquid crystal molecules adjacent to the electrode substrate with respect to the substrate (i.e. a tilt angle) is made larger. In such a case, a direction reverse to the rubbing direction shown by arrow in FIGS. 1 and 2 is employed as the direction of oblique evaporation.

The maximum value of the twist angle $\alpha$ is limited to 360° because the liquid crystal structure with the twist angle of more than 360° is so reoriented as to scatter light and hence the contrast of display deteriorates when the liquid crystal layer is in an ON state and is applied with a voltage at or near the threshold voltage. The lower limit of the twist angle $\alpha$ is determined by contrast and the time-multiplexed drive characteristics and is given to be 160°.

Each of an angle $\beta_1$ between a polarization axis 8 of the upper polarizer 15 and the rubbing direction 6 of the upper substrate 11 and an angle $\beta_2$ between a polarization axis 9 of the lower polarizer 16 and the rubbing direction 7 of the lower substrate 12 preferably falls within a range between 20° and 70° when contrast, brightness, color and the like are considered.

When the optical or refractive-index anisotropy of the liquid crystal and the thickness of the liquid crystal layer are given to be $\Delta n$ and d ($\mu m$), respectively, the liquid crystal display device according to the present invention depends on $\Delta n \cdot d$, i.e., an optical path difference. When a condition of 0.7 $\mu m \leq \Delta n \cdot d \leq 1.2$ $\mu m$ is satisfied in consideration of contrast, brightness, color and the like, satisfactory results are obtained. The optical anisotropy $\Delta n$ generally depends on wavelengths. The optical anisotropy is increased when the wavelength is short, while it is decreased when the wavelength becomes long. The values of optical anisotropy $\Delta n$ used in the present specification are measured by using an He-Ne laser beam of a wavelength of 6,328 Å at a temperature of 25° C. When the optical anisotropy is measured at another wavelength, it may be slightly different from that disclosed in the present specificaiton.

The construction and the measured results of the liquid crystal display device according to a specific embodiment of the present invention will now be described.

Figure 3:
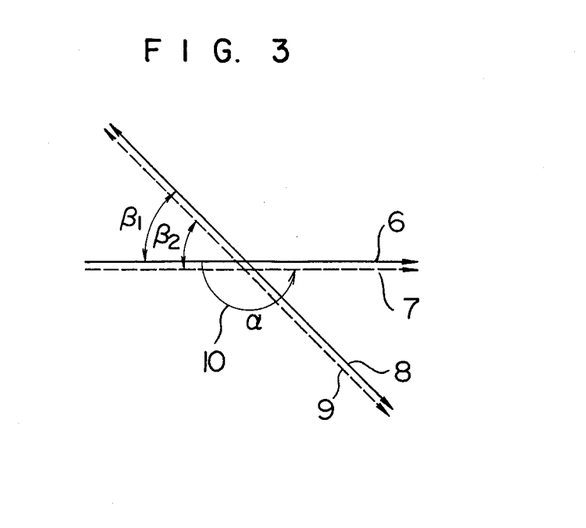
FIG. 3 is a representation similar to FIG. 1 for a concrete embodiment of the invention.

FIG. 3 shows the relationship between the rubbing directions of the substrates, the twist direction and angle of the helical structure of the liquid crystal molecules, and the polarization axes of the polarizers when the liquid crystal display device is viewed from the upper direction. The liquid crystal used comprises a nematic liquid crystal. This nematic liquid crystal contains as major constituents biphenyl liquid crystal and ester cyclohexane (ECH) liquid crystal. The nematic liquid crystal further contains as an additive 0.5% by weight of a chiral material S811 available from Merk Corporation. The optical anisotropy $\Delta n$ of this nematic liquid crystal is 0.123. The compound of the liquid crystal is given in Table 1.

TABLE 1

| Component | Content (% by weight) |
|---|---|
| $C_4H_9$—⟨H⟩—$CO_2$—⟨⟩—$OC_2H_5$ | 21 |
| $C_3H_7$—⟨H⟩—$CO_s$—⟨⟩—$OC_2H_5$ | 21 |
| $C_5H_{11}$—⟨H⟩—$CO_2$—⟨⟩—$OCH_3$ | 21 |
| $C_2H_5$—⟨⟩—⟨⟩—CH | 8 |
| $C_4H_9$—⟨⟩—⟨⟩—CH | 8 |
| $C_2H_5$—⟨⟩—$CO_2$—⟨⟩—CN | 7.5 |
| $C_3H_7$—⟨⟩—⟨⟩—$CO_2$—⟨⟩—⟨H⟩—$C_3H_7$ (F) | 7 |
| $C_3H_7$—⟨⟩—⟨⟩—$CO_2$—⟨⟩—⟨H⟩—$C_5H_{11}$ | 6 |
| S811 | 0.5 |

In FIG. 3, the rubbing directions 6 and 7 of the upper and lower substrates 11 and 12 are parallel to each other. The twist direction 10 and the twist angle $\alpha$ of 180° are determined by the chiral material S811. The polarization axis 8 of the upper polarizer 15 is parallel to the polarization axis 9 of the lower polarizer 16, and each of the angle $\beta_1$ between the polarization axis 8 and the rubbing direction 6 and the angle $\beta_2$ between the polarization axis 9 and the rubbing direction 7 is 45°.

In the device according to the present invention, both the polarization axis and absorption axis of the polarizer do not coincide with the optical axis of liquid crystal molecules or the liquid crystal molecule aligning direction of the electrode substrate. Therefore, the liquid crystal molecules exhibit an effect of birefringence so that the transmittance of light through the device depends on wavelengths with a result that light emerging from the device is colored. According to the present invention, however, at least one of a pair of polarizers disposed before and behind the liquid crystal layer is formed by a color polarizer in order that light emerging from the device toward an observer becomes approximately achromatic or colorless.

Figure 5:
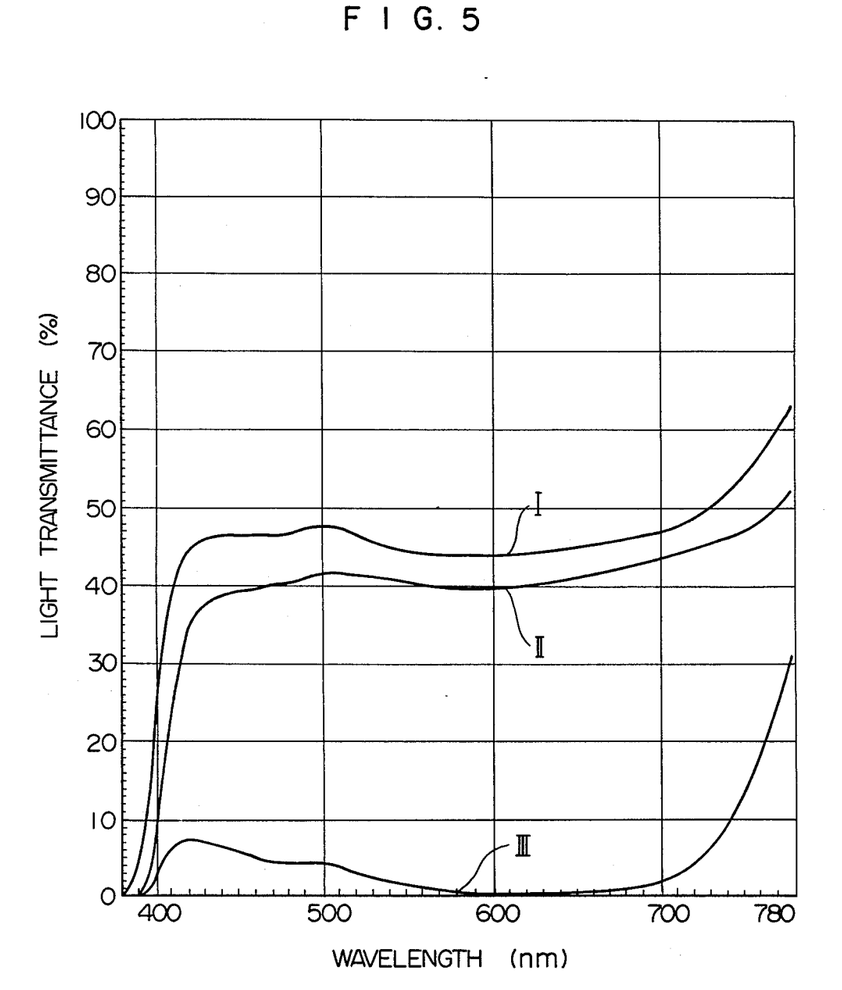
FIG. 5 shows an example of the spectral transmittance characteristic of a neutral polarizer.

Prior to optimizing the spectral characteristic of the color polarizer which can be used in the present invention, evaluation has been made for the case where a neutral polarizer having such spectral characteristics as shown in FIG. 5 is used as the upper and lower polarizers 15 and 16 shown in FIG. 2. In FIG. 5, curve I represents a spectral transmittance characteristic of the neutral polarizer, curve II represents a spectral transmittance characteristic when two neutral polarizers each having the characteristic shown by curve I are superimposed with their polarization axes parallel to each other, and curve III represents a spectral transmittance characteristic when such two neutral polarizers are superimposed with their polarization axes crossed with respect to each other.

Displayed colors and brightness for a number of liquid crystal cells which have the same construction as FIG. 3 but use neutral polarizers as the upper and lower polarizers 15 and 16 and in which various values of thickness d of liquid crystal layers resulting in various values of $\Delta n \cdot d$ are employed, have been tested in the above-mentioned JP-A No. 60-50511. The results of test are shown in Table 2. Apart from a problem of coloring, a range of $\Delta n \cdot d$ values from 0.7 μm to 1.2 μm may provide practically usable display devices, as is disclosed by the JP-A No. 60-50511.

TABLE 2

| $\Delta n \cdot d$ (μm) | Brightness | Color |
| --- | --- | --- |
| 0.50 | dark | yellow to reddish brown |
| 0.63 | dark | blue to purple |
| 0.76 | dark | light blue |
| 0.86 | slightly bright | green |
| 0.98 | bright | yellowish green |
| 1.15 | bright | reddish orange |
| 1.30 | slightly dark | reddish purple |
| 1.45 | dark | bluish green |

The JP-A No. 60-50511 has also disclosed the measured results of the time-multiplexed drive characteristics of the liquid crystal cell having $\Delta n \cdot d$ of 0.98 μm. The results are shown in (B) of Table 3. Table 3 further shows in (A) the results for usual 90° twisted nematic liquid crystal cells when $\Delta n \cdot d$ is 0.5 μm and 1.0 μm, respectively. In Table 3, $\gamma$, $\Delta \phi$ and m represent a luminance-voltage

TABLE 3

| Charac-teristics | $\Delta n \cdot d$ | | |
| --- | --- | --- | --- |
| | (A) | | (B) |
| | 0.5 μm | 1.0 μm | 0.98 μm |
| $\gamma$ | 1.150 | 1.084 | 1.033 |
| $\Delta \phi$ | 0.965 | 0.877 | 0.988 |

TABLE 3-continued

| Charac-teristics | $\Delta n \cdot d$ | | |
| --- | --- | --- | --- |
| | (A) | | (B) |
| | 0.5 μm | 1.0 μm | 0.98 μm |
| m | 0.839 | 0.808 | 0.956 | characteristic, a viewing-angle dependence and a time-multiplexability, respectively. When a voltage corresponding to the 90% luminance at the viewing angle $\phi$ of 10° is represented as a threshold voltage $V_{th1}$, the voltage corresponding to the 50% luminance at the same viewing angle is represented as a saturation voltage $V_{sat1}$, and a voltage corresponding to the 90% luminance at a viewing angle of 40° is represented by a threshold voltage $V_{th2}$, $\gamma$, $\Delta \phi$ and m defined as follows:

$\gamma = V_{sat1}/V_{th1}$ $\Delta \phi = V_{th2}/V_{th1}$ $m = V_{th2}/V_{sat1}$ The time-multiplexed drive characteristics are better with smaller value of $\gamma$, larger value of $\Delta \phi$ and larger value of m. Accordingly, it can be seen from Table 3 that all the characteristics $\gamma$, $\Delta \phi$ and m in the case of the construction shown in FIG. 3 are remarkably improved in comparison with the usual 90° twisted cell.

Figure 6:
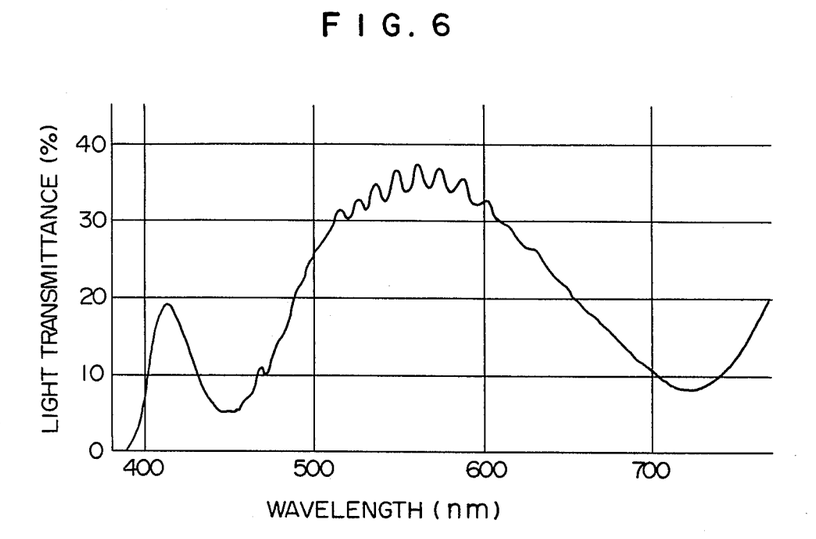
FIG. 6 is a view useful in explaining the wavelength dependence of transmittance of a liquid crystal display device which appears due to the anti-coincidence between the polarization axis of the polarizer and the liquid crystal molecule aligning direction of the electrode substrate.
Figure 7:
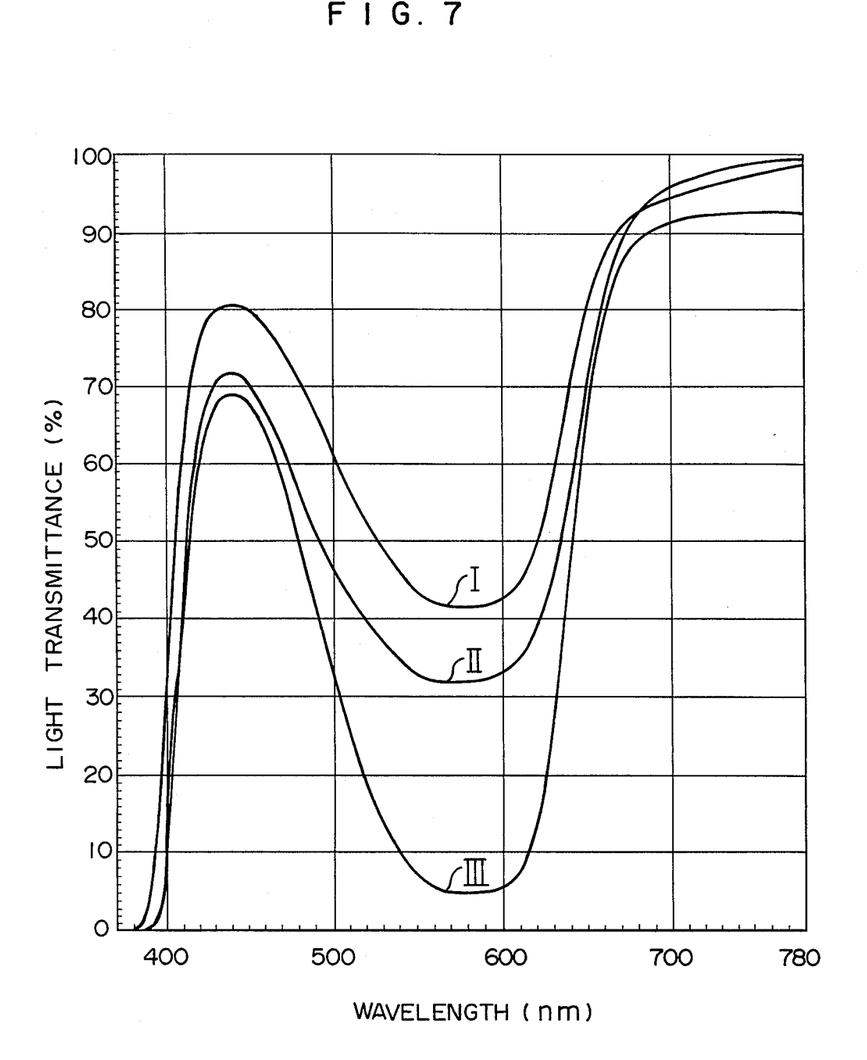
FIG. 7 shows the spectral transmittance characteristic of an example of a color polarizer which can be used in the invention.

For a liquid crystal display device which has the same construction as FIG. 3 and in which both the upper and lower polarizers 15 and 16 are neutral polarizers and the value of $\Delta n \cdot d$ is about 1 μm, FIG. 6 shows the spectral transmittance of light transmitted through the lower polarizer 16. From FIG. 6, it is understood that the display appearance has a yellow background. Thus, when the neutral polarizers having such spectral characteristic as shown in FIG. 5 are used as the upper and lower polarizers, the intensity of spectral transmittance through the device is lowered in a blue region. In order to prevent such a phenomenon, the embodiment of the present invention uses as the lower polarizer 16 a color polarizer having a spectral characteristic in which the transmittance in a green region and/or a region in the vicinity of the green region is lower than that in the other spectral region, as shown in FIG. 7, for example, a polarizer which exhibits magenta or a color in a bluish purple to reddish purple region. In FIG. 7, curve I represents a spectral transmittance characteristic of the color polarizer, curve II represents a spectral transmission characteristic when two color polarizers each having the characteristic shown by curve I are superimposed with their polarization axes parallel to each other, and curve III represents a spectral transmittance characteristic when such two color polarizers are superimposed their polarization axes crossed with respect to each other.

Figure 8:
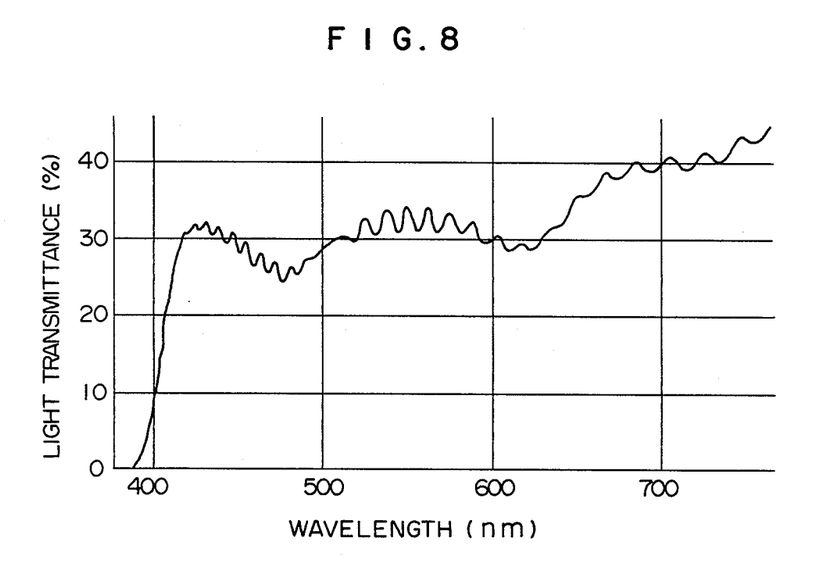
FIG. 8 shows the spectral transmittance of a liquid crystal display device according to the embodiment of FIG. 3 of the invention.

The present inventors have measured the spectral characteristic of light transmitted through the lower polarizer 16 for a liquid crystal display device which has the same construction as FIG. 3 and in which the neutral polarizer exhibiting the spectral transmittance characteristic shown by curve I of FIG. 5 and the color polarizer exhibiting the spectral transmittance characteristic shown by curve I of FIG. 7 are used as the upper and lower polarizers 15 and 16 respectively and the value of $\Delta n \cdot d$ is about 1 μm. The result of measurement is shown in FIG. 8. As apparent from FIG. 8, the spectral transmittance characteristic is approximately flat over a wide range of visible wavelengths as compared with FIG. 6. As a result, light emerging from the device becomes substantially or approximately achromatic. Namely, the display appearance of the liquid crystal display device can provide an achromatic background, thereby greatly improving the quality of display characteristics.

The evaluation of FIG. 8 has been made in conjunction with the light transmitted through the lower polarizer 16. A similar result has been obtained for the spectral characteristic of light which is reflected by the reflector plate 20 of FIG. 2 and then passes through the upper polarizer 15 again.

Figure 9:
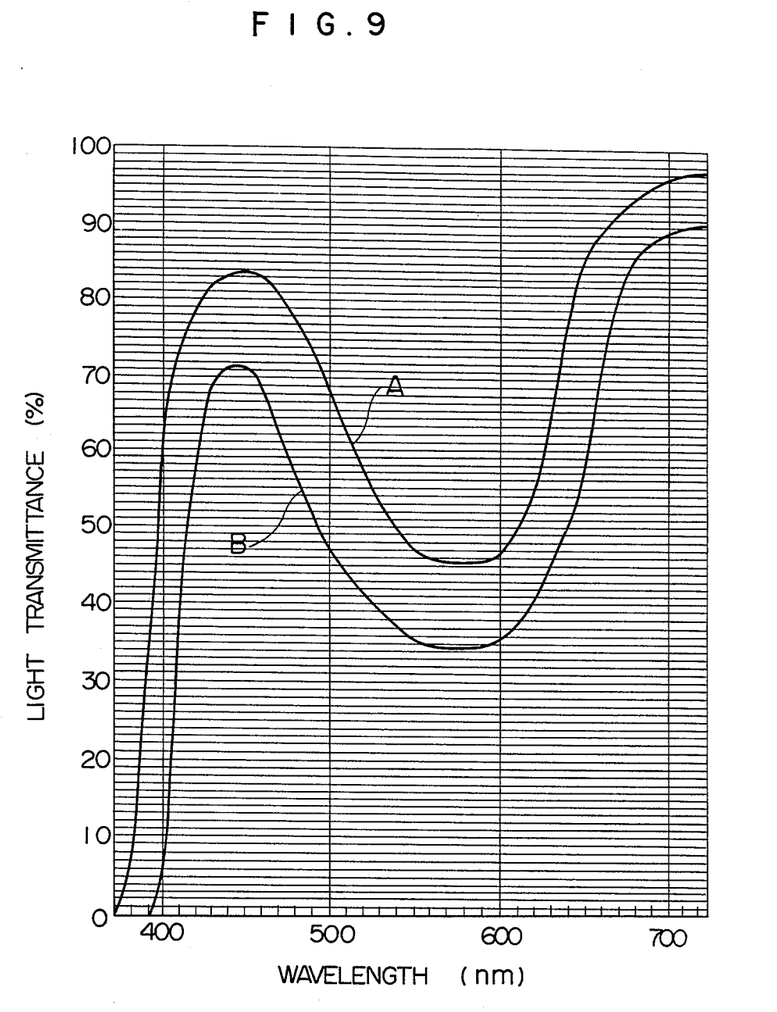
FIG. 9 is a view showing a preferable area of the spectral transmittance of a color polarizer which can be used in the invention.

Though the present invention has been explained with respect to the specified embodiment, the essence of the invention is that at least one of a pair of polarizers is formed by a color polarizer which compensates a wavelength dependence of transmittance resulting from the anti-coincidence between the polarization axis of the polarizer (or the plane of polarization of incident light) and the aligning direction of the electrode substrate (or an optical axis of liquid crystal molecules adjacent to the substrate). The present inventors have found out that the use of a color polarizer having a spectral characteristic falling within an area enclosed between curves A and B shown in FIG. 9 provides a practically satisfactory result so long as the twist angle $\alpha$ is 160° to 360°, each of the inclination angles $\beta_1$ and $\beta_2$ is 20° to 70° and the value of $\Delta n \cdot d$ is 0.7 $\mu m$ to 1.2 $\mu m$.

In FIG. 3, the absorption axes of the polarizers can be arranged in place of the polarization axes to obtain the same effect. Though in the specified embodiment a liquid crystal mixture of biphenyl and ECH liquid crystals has been used, any other nematic liquid crystal having a positive dielectric anisotropy may be used to obtain a similar effect. Though the twist direction of the helical structure has been shown to be a counterclockwise direction in the above embodiment, it may be clockwise, as shown in FIG. 4, to obtain the same effect as in the above embodiment.

Figure 4:
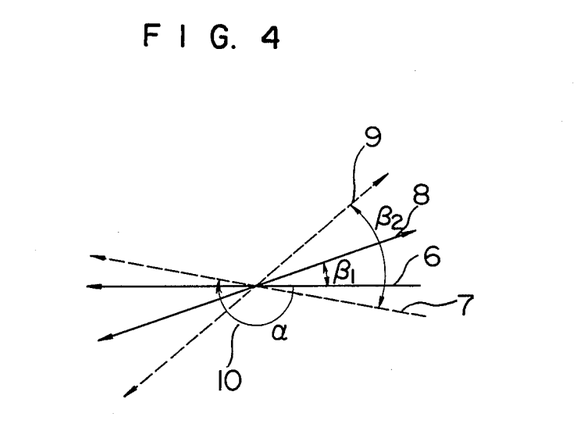
FIG. 4 is a representation similar to FIG. 1 in the case where the twist direction is clockwise.

The kind of chiral material is not particularly limited to the disclosed material so long as the relationships between the rubbing directions and the twist directions shown in FIGS. 1, 3 and 4 are held.

We claim:

1. A liquid crystal display device comprising:

a pair of electrode substrates disposed opposite to each other and a liquid crystal layer sandwiched therebetween, said liquid crystal layer including a nematic liquid crystal which has a positive dielectric anisotropy and is added with a chiral material, each of said electrode substrates having a surface structure which aligns molecules of the liquid crystal adjacent to that electrode substrate in a predetermined direction, said liquid crystal layer having a helical structure twisted within a range between 160° and 360° along a direction of thickness thereof; and a pair of polarizers disposed adjacent to said electrode substrates at both sides of said liquid crystal layer, each of said polarizers having its polarization axis inclined by a predetermined angle with respect to the liquid crystal molecule aligning direction of the electrode substrate adjacent to that polarizer, at least one of said polarizers being formed by a color polarizer having a spectral characteristic which compensates coloring due to an effect of birefringence resulting from anticoincidence between the polarization axis of the polarizer and the liquid crystal molecule aligning direction of the electrode substrate, whereby light emerging from the device becomes approximately achromatic.

2. A liquid crystal display device according to claim 1, wherein said predetermined angle of inclination of the polarization axis of the polarizer with respect to the liquid crystal molecule aligning direction of the electrode substrate is in a range from 20° to 70°.

3. A liquid crystal display device according to claim 2, wherein a product $\Delta n \cdot d$ of the thickness d ($\mu m$) of said liquid crystal layer and an optical anisotropy $\Delta n$ of said nematic liquid crystal is in a range from 0.7 $\mu m$ to 1.2 $\mu m$.

4. A liquid crystal display device according to claim 3, wherein the spectral characteristic of said color polarizer is selected to fall within an area enclosed between curves A and B of FIG. 9.

5. A liquid crystal display device according to claim 2, further comprising a reflector plate disposed adjacent to one of said polarizers, the one polarizer being formed by said color polarizer and the other of said polarizers being formed by a neutral polarizer.

6. A liquid crystal display device according to claim 3, wherein said color polarizer is a magenta polarizer.

* * * * *